(12) United States Patent
Haack et al.

(10) Patent No.: US 10,150,161 B2
(45) Date of Patent: Dec. 11, 2018

(54) CONTACT ARRANGEMENT FOR USE IN AN APPARATUS FOR PRODUCING THREE-DIMENSIONAL WORK PIECES

(71) Applicant: SLM Solutions Group AG, Luebeck (DE)

(72) Inventors: Bodo Haack, Luebeck (DE); Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 328 days.

(21) Appl. No.: 14/940,287

(22) Filed: Nov. 13, 2015

(65) Prior Publication Data

US 2016/0144430 A1    May 26, 2016

(30) Foreign Application Priority Data

Nov. 20, 2014  (EP) ..................................... 14194128

(51) Int. Cl.
*B22F 3/00* (2006.01)
*B22F 3/105* (2006.01)
(Continued)

(52) U.S. Cl.
CPC ............ *B22F 3/1055* (2013.01); *B22F 3/003* (2013.01); *B22F 7/02* (2013.01); *B23K 9/044* (2013.01);
(Continued)

(58) Field of Classification Search
CPC .. B23K 37/0443; B23K 26/342; B22F 3/1055
(Continued)

(56) References Cited

U.S. PATENT DOCUMENTS 7,357,629 B2    4/2008  Weiskopf et al.
7,790,096 B2    9/2010  Merot et al.
(Continued)

FOREIGN PATENT DOCUMENTS

DE    20213009787 U1    12/2013
JP        03051017 A     3/1991
(Continued)

OTHER PUBLICATIONS

European Patent Office, Extended European Search Report issued in Application No. 14194128.6, dated Apr. 22, 2015, 7 9 pp.
(Continued)

*Primary Examiner* — Mark A Chapman
(74) *Attorney, Agent, or Firm* — Taft, Stettinius & Hollister LLP

(57) ABSTRACT

A contact arrangement (44) for use in an apparatus (10) for producing three-dimensional work pieces by irradiating layers of a raw material powder with electromagnetic or particle radiation, the contact arrangement (44) comprises a replaceable building chamber (20) adapted to receive a work piece generated in the apparatus (10) by an additive layering process and a building chamber support element (38) adapted to support the replaceable building chamber (20). A first contact element (46) is fastened to the replaceable building chamber (20) and comprises at least one first electrical conductor element (48), the first electrical conductor element (48) being provided with a first planar conductor surface (50). A second contact element (52) is fastened to the building chamber support element (38) and comprises at least one second electrical conductor element (54), the second electrical conductor element (54) being provided with a second planar conductor surface (56). The first planar conductor surface (50) provided on the first electrical conductor element (48) of the first contact element
(Continued)

Figure 1:
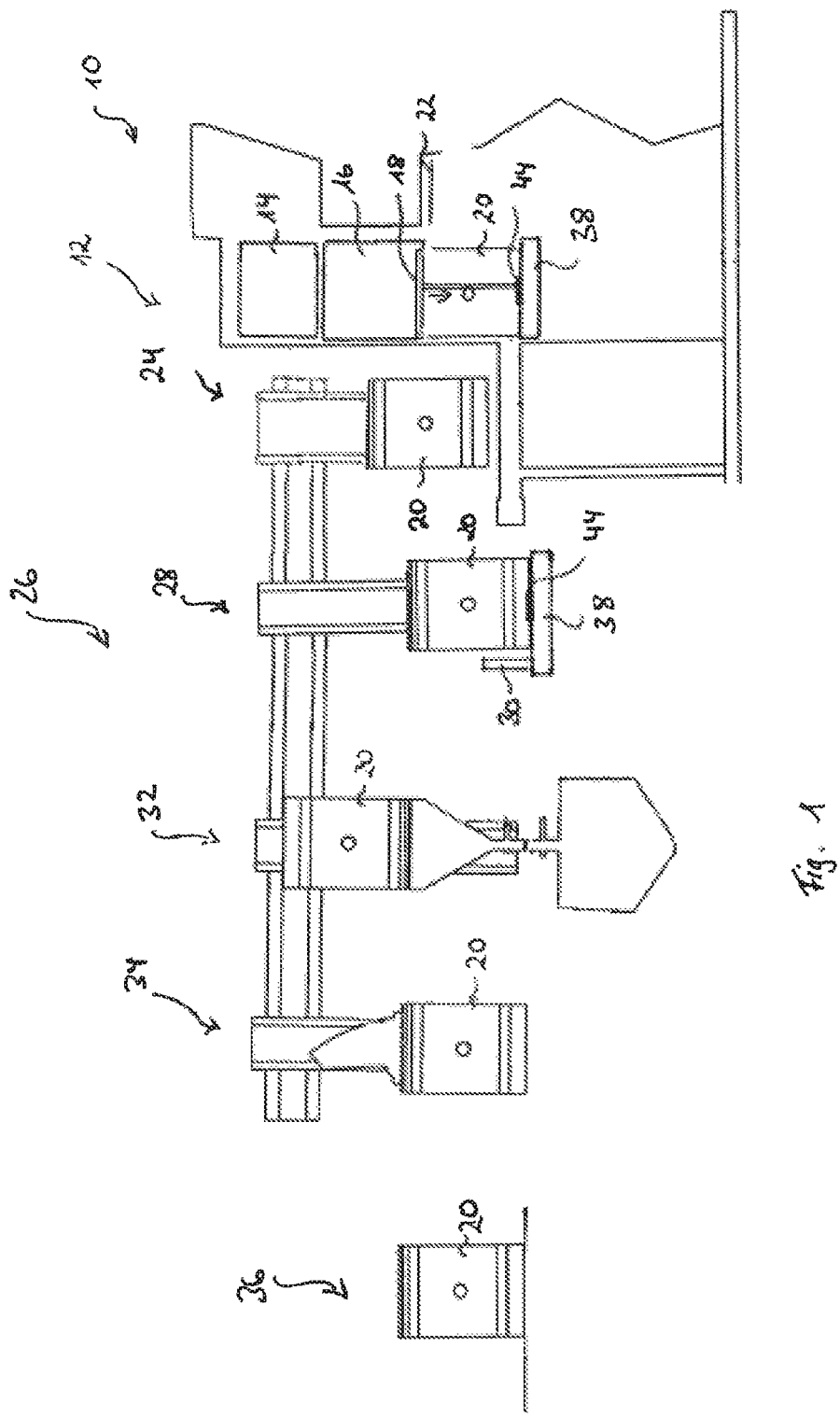

(46) and the second planar conductor surface (56) provided on the second electrical conductor element (52) of the second contact element (52) are adapted to interact with each other so as to establish an electrical contact between the replaceable building chamber (20) and the building chamber support element (38) when the replaceable building chamber (20) is supported on the building chamber support element (38).

14 Claims, 3 Drawing Sheets

(51) Int. Cl.
| | |
|---|---|
| B23K 26/342 | (2014.01) |
| B23K 37/04 | (2006.01) |
| B33Y 10/00 | (2015.01) |
| B33Y 30/00 | (2015.01) |
| B22F 7/02 | (2006.01) |
| B23K 9/04 | (2006.01) |
| C04B 35/64 | (2006.01) |
| B29C 64/153 | (2017.01) |
| B29C 64/20 | (2017.01) |

(52) U.S. Cl.
CPC ........ *B23K 26/342* (2015.10); *B23K 37/0443* (2013.01); *B29C 64/153* (2017.08); *B29C 64/20* (2017.08); *B33Y 10/00* (2014.12); *B33Y 30/00* (2014.12); *C04B 35/64* (2013.01); *B22F 2003/1056* (2013.01); *B22F 2003/1058* (2013.01); *Y02P 10/295* (2015.11)

(58) Field of Classification Search
USPC .............................................. 419/1
See application file for complete search history.

(56) References Cited

U.S. PATENT DOCUMENTS

| | | | |
|---|---|---|---|
| 2004/0045941 A1 | 3/2004 | Herzog et al. | |
| 2016/0107263 A1* | 4/2016 | Koerber ................ | B22F 3/1055 |
| | | | 219/76.12 |

FOREIGN PATENT DOCUMENTS

| | | |
|---|---|---|
| JP | 2004516166 A | 6/2004 |
| JP | 2006289973 A | 11/2006 |
| JP | 2006312310 A | 11/2006 |

OTHER PUBLICATIONS

Office Action, JP2015-226581, Nov. 1, 2016, with partial translation, 4 pages.

* cited by examiner

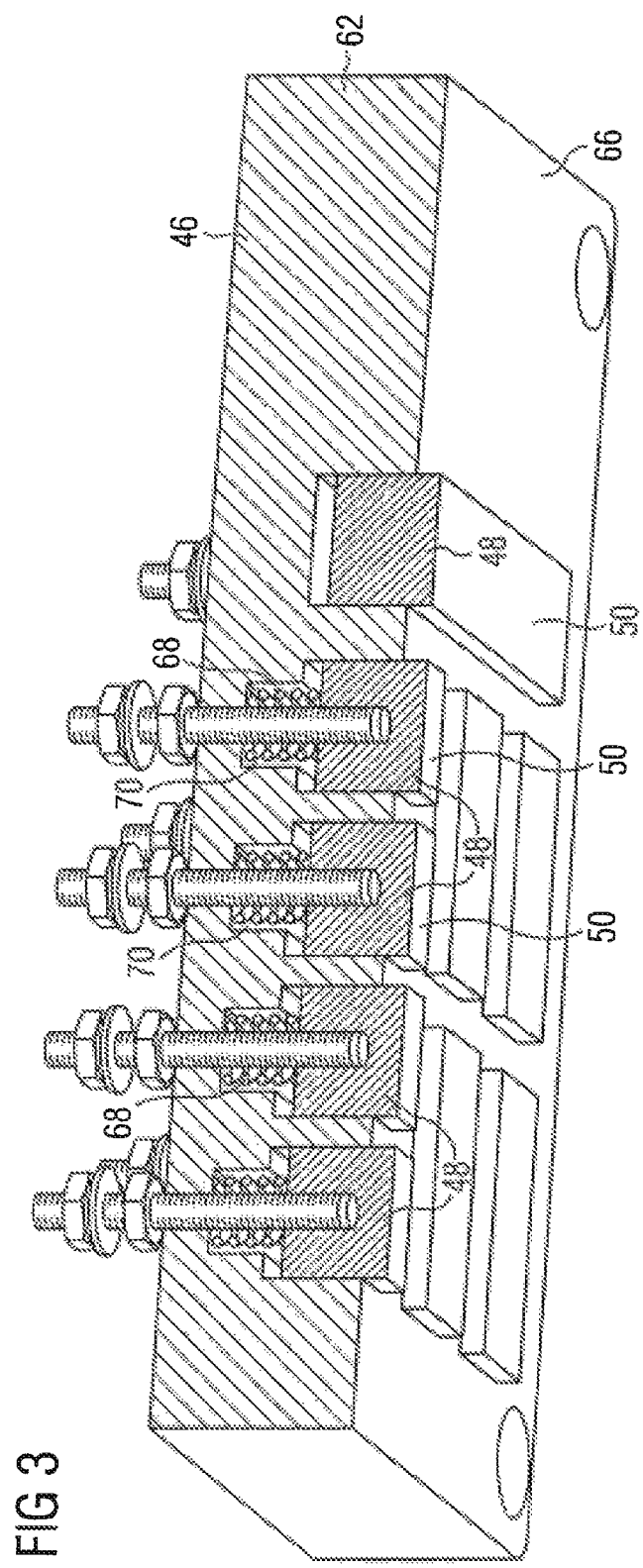

CONTACT ARRANGEMENT FOR USE IN AN APPARATUS FOR PRODUCING THREE-DIMENSIONAL WORK PIECES

The present invention relates to a contact arrangement for use in an apparatus for producing three-dimensional work pieces by irradiating layers of a raw material powder with electromagnetic or particle radiation. The invention further relates to an apparatus for producing three-dimensional work pieces by irradiating layers of a raw material powder with electromagnetic or particle radiation which is equipped with a contact arrangement of this kind and a method of operating an apparatus of this kind.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopedic prostheses, on the basis of CAD data.

An apparatus which is suitable for producing a larger number of moulded bodies from pulverulent raw materials by a powder bed fusion process is described in DE 20 2013 009 787 U1. The prior art apparatus is provided with a work piece generating section comprising an irradiation device and a process chamber. The process chamber may be sealed against the ambient atmosphere and accommodates a carrier for receiving a raw material powder as well as a work piece that is generated from the raw material powder on the carrier by an additive layering process. The carrier is displaceable relative to the process chamber into a building chamber in order to compensate for an increasing height of the work piece upon being generated. The building chamber may be sealed against the ambient atmosphere by means of a cover and thereafter may be transferred from an operating position adjacent to the process chamber into an exchange position outside of the work piece generating section. From the exchange position, the building chamber is further transferred to a post-treatment section. In the post-treatment section, the work piece accommodated within the building chamber is cooled, excess raw material powder is discharged from the building chamber and the work piece finally is removed from the building chamber. As soon as the building chamber has left the exchange position so as to be transferred to the post-treatment section, a replacement building section may be introduced into the work piece generating section in order to produce a further work piece.

The invention is directed at the object of providing a contact arrangement for use in an apparatus for producing three-dimensional work pieces by irradiating layers of a raw material powder with electromagnetic or particle radiation which allows a larger number of work pieces to be generated in a particularly efficient manner. The invention is further directed at the object of providing an apparatus for producing three-dimensional work pieces by irradiating layers of a raw material powder with electromagnetic or particle radiation which allow a larger number of work pieces to be generated in a particularly efficient manner. Finally, the invention is directed at the object of providing a method of operating an apparatus of this kind.

This object is addressed by a contact arrangement as defined in claim 1, an apparatus as defined in claim 7 and a method as defined in claim 11.

A contact arrangement for use in an apparatus for producing three-dimensional work pieces by irradiating layers of a raw material powder with electromagnetic or particle radiation comprises a replaceable building chamber adapted to receive a work piece generated in the apparatus by an additive layering process. The replaceable building chamber, in the apparatus, may be movable between an operating position, an exchange position and a pre/post-treatment position. In its operating position, the replaceable building chamber may be arranged adjacent to a process chamber, wherein the three-dimensional work piece is generated on a carrier by irradiating raw material powder layers applied to the carrier with electromagnetic or particle radiation. The carrier may be displaceable relative to the process chamber into the building chamber in order to transfer a work piece generated in the process chamber into the building chamber in order to compensate for the height gain of the work piece upon being generated.

The replaceable building chamber may be sealable against the ambient atmosphere which allows the replaceable building chamber to be transferred from its operating position into its exchange position with a generated work piece accommodated therein without exposing the work piece to the ambient atmosphere. From its exchange position the replaceable building chamber may be further transferred to its pre/post-treatment position. As soon as the replaceable building chamber has been removed from its exchange position, a new building chamber may be installed in place in the apparatus at the operating position adjacent to the process chamber and a new work piece may be generated. Of course, after being subjected to appropriate pre/post-treatment in its pre/post-treatment position, the replaceable building chamber may be reused in the apparatus, i.e. may be transferred back into its operating position so as to receive a further work piece.

The contact arrangement further comprises a building chamber support element which is adapted to support the replaceable building chamber. The building chamber support element may be adapted for arrangement anywhere in the apparatus for producing three-dimensional work pieces as long as it is suitable to hold the replaceable building chamber in a desired position. For example, the replaceable building chamber may have a cylindrical, in particular a circular cylindrical shape with a substantially planar bottom surface. The building chamber support element then may be of a substantially plate-shaped design and may comprise a substantially planar support surface for receiving the replaceable building chamber thereon.

A first contact element of the contact arrangement is fastened to the replaceable building chamber and comprises at least one first electrical conductor element. The first electrical conductor element is provided with a first planar conductor surface. The first electrical conductor element may be of any suitable design as long as it is provided with an exposed first planar conductor surface. For example, the first electrical conductor element may be designed in the form of a cuboid and the first planar conductor surface of the first electrical conductor may be formed by one of the side faces of the cuboid. If desired, the first contact element may comprise a plurality of first electrical conductor elements having the same shape or different shapes.

A second contact element is fastened to the building chamber support element and comprises at least one second electrical conductor element. The second electrical conductor element is provided with a second planar conductor surface. Like the first electrical conductor element, also the second electrical conductor element may be of any suitable design as long as it is provided with an exposed second planar conductor surface. For example, the second electrical conductor element also may be designed in the form of a cuboid and the second planar conductor surface of the second electrical conductor may be formed by one of the side faces of the cuboid. If desired, the second contact element may comprise a plurality of second conductor elements having the same shape or different shapes.

The first planar conductor surface provided on the first electrical conductor element of the first contact element and the second planar conductor surface provided on the second electrical conductor element of the second contact element are adapted to interact with each other so as to establish an electrical contact between the replaceable building chamber and the building chamber support element when the replaceable building chamber is supported on the building chamber support element. In other words, the planar conductor surfaces provided on the first and the second electrical conductor element are adapted to be brought into contact with each other to thereby electrically connect the replaceable building chamber to the building chamber support element and hence to connect the replaceable building chamber to an electrical system of the apparatus for producing three-dimensional work pieces. Preferably, the shapes of the first and the second planar conductor surface are adjusted to each other, i.e. in a preferred embodiment of the contact arrangement, the first and the second planar conductor surface are identically or at least similarly shaped.

Since the first and the second electrical conductor elements are provided with planar conductor surfaces, the electrical contact between the replaceable building chamber and the building chamber support element can be established in a quick and easy manner without the risk of damaging the conductor elements when the replaceable building chamber is placed on the building chamber support element. Similarly, the electrical connection between the replaceable building chamber and the building chamber support element can easily be interrupted when the replaceable building chamber is removed from the chamber support element. Hence, in an apparatus for producing three-dimensional work pieces which is equipped with the contact arrangement, the transfer of the replaceable building chamber between various positions within the apparatus can be effected in particularly efficient manner and the apparatus can be operated reliably and with reduced maintenance efforts.

In a preferred embodiment of the contact arrangement, the first contact element is fastened to the replaceable building chamber in such a manner that the first planar conductor surface provided on the first electrical conductor element is arranged in the region of a bottom surface of the replaceable building chamber. The second contact element preferably is fastened to the building chamber support element in such a manner that the second planar conductor surface provided on the second electrical conductor element is arranged in the region of a support surface of the building chamber support element. This design of the contact arrangement allows the electrical contact between the replaceable building chamber and the building chamber support element to be established particularly easy by simply lowering the replaceable building chamber onto the building chamber support element. Similarly, the electrical contact between the replaceable building chamber and the building chamber support element can be interrupted by simply lifting the replaceable building chamber from the building chamber support element.

The first contact element may comprise a base element which is provided with at least one recess for accommodating the first electrical conductor element. In case the first contact element comprises more than one first electrical conductor element, the base element of the first contact element may be provided with a plurality of recesses, each recess being adapted to receive a respective first electrical conductor element. Additionally or alternatively thereto, the second contact element may comprise a base element which is provided with at least one recess for accommodating the second electrical conductor element. In case the second contact element comprises more than one second electrical conductor element, the base element of the second contact element may be provided with a plurality of recesses, each recess being adapted to receive respective second electrical conductor element.

The first electrical conductor element may be a fixed conductor element, i.e. the first electrical conductor element may be fixedly attached to a base element of the first element with its first planar conductor surface being arranged flush with the surface of the base element and an electrical connection between the first planar conductor surface and the replaceable building chamber being continuously established. It is, however, also conceivable that the first electrical conductor element is movable relative to the base element of the first contact element between a first position and a second position. When the first electrical conductor element is arranged in its first position, the first planar conductor surface provided on the first electrical conductor element may protrude from a surface of the base element. To the contrary, when the first electrical conductor element is arranged in its second position, the first planar conductor surface provided on the first electrical conductor element may be arranged flush with the surface of the base element.

Basically, also the second electrical conductor element may be a fixed conductor element, i.e. the second electrical conductor element may be fixedly attached to a base element of the second contact element with its second planar conductor surface being arranged flush with the surface of the base element and an electrical connection between the second planar conductor surface and the building chamber support element being continuously established. Alternatively, it is, however, also conceivable to provide the second contact element with a second electrical conductor element which is movable relative to the base element of the second contact element between a first position, wherein the second planar conductor surface provided on the second electrical conductor element protrudes from a surface of the base element, and a second position, wherein the second planar conductor surface provided on the second electrical conductor element is arranged flush with the surface of the base element.

A movable first electrical conductor element may be biased into its first position by means of a biasing device. Similarly, also movable second electrical conductor element may be biased into its first position by means of a biasing device. A biasing force applied to the first and/or the second electrical conductor element, which urges the first and/or the second electrical conductor element into the first position, ensures that a reliable electrical connection can be established between the first planar conductor surface provided on the first electrical conductor element of the first contact element and the second planar conductor surface provided on the second electrical conductor element of the second contact element when the first and the second planar conductor surface are brought into engagement. The biasing device may be designed, for example, in the form of a spring and may be suitable to apply a spring force of approximately 14 N to a first or second electrical conductor element.

The contact arrangement may comprise a fixed first conductor element and a fixed second conductor element or movable first conductor element and a movable second conductor element. Furthermore, it is conceivable to equip the contact arrangement with one fixed conductor element and one movable conductor element. In this arrangement, preferably the first conductor element is of a movable design.

An apparatus for producing three-dimensional work pieces by irradiating layers of a raw material powder with electromagnetic or particle radiation comprises an irradiation device. The irradiation device may comprise at least one radiation source, in particular a laser source, and at least one optical unit for guiding and/or processing a radiation beam emitted by the radiation source. The optical unit may comprise optical elements such an object lens, in particular an f-theta lens, and a scanner unit, the scanner unit preferably comprising a diffractive optical element and a deflection mirror. Further, the apparatus comprises a process chamber which may be sealable against the ambient atmosphere in order to be able to establish and maintain a controlled atmosphere, in particular an inert atmosphere within the process chamber.

A replaceable building chamber is adapted to be arranged adjacent to the process chamber. In particular, the replaceable building chamber may be adapted to be arranged at different positions in the apparatus, for example in an operating position adjacent to the process chamber, in an exchange position and in a pre/post-treatment position. The apparatus further comprises a carrier for receiving a raw material powder as well as a work piece that is generated from the raw material powder on the carrier by an additive layering process in the process chamber. The raw material powder may be applied to the carrier by means of a powder application device and preferably is a metallic powder, in particular a metal alloy powder, but may also be a ceramic powder or a powder containing different materials. The powder may have any suitable particle size or particle size distribution. It is, however, preferable to process powders of particle sizes <100 µm. The carrier is displaceable relative to the process chamber into building chamber in order to compensate for the height gain of a work piece upon being generated in the process chamber and in order to transfer the work piece generated in the process chamber by an additive layering process into the replaceable building chamber.

The apparatus further comprises a building chamber support element adapted to support the replaceable building chamber. The building chamber support element may be arranged anywhere in the apparatus for producing three-dimensional work pieces as long as it is suitable to hold the replaceable building chamber in a desired position.

A first contact element is fastened to the replaceable building chamber and comprises at least one first electrical conductor element. The first electrical conductor element is provided with a first planar conductor surface. A second contact element is fastened to the building chamber support element and comprises at least one second electrical conductor element. The second electrical conductor element is provided with a second planar conductor surface. The first planar conductor surface provided on the first electrical conductor element of the first contact element and the second planar conductor surface provided on the second electrical conductor element of the second contact element are adapted to interact with each other so as to establish an electrical contact between the replaceable building chamber and the building chamber support element when the replaceable building chamber is supported on the building chamber support element.

All features discussed above with reference to the contact arrangement, in particular features of the replaceable building chamber, the building chamber support element, the first contact element and the second contact element may also be present in the apparatus for producing three-dimensional work pieces.

The building chamber support element may be adapted to support the replaceable building chamber while being arranged in its operating position adjacent to the process chamber.

In a preferred embodiment, the apparatus further comprises a pre/post-treatment section which is adapted to accommodate the replaceable building chamber before or after being arranged adjacent to the process chamber in its operating position. The pre/post-treatment section may for example comprise an excess powder discharge section wherein excess raw material powder is removed from the replaceable building chamber, a work piece removing station wherein the generated work piece is removed from the replaceable building chamber or a parking station wherein the replaceable building chamber is stored until being transferred back into its operating position adjacent to the process chamber of the apparatus.

In a particularly preferred embodiment, the pre/post-treatment section of the apparatus comprises a heating station which is provided with a heating element for heating the replaceable building chamber while being accommodated in the heating station. The heating station may be used to heat an empty replaceable building chamber to a desired temperature before the replaceable building chamber is transferred into its operating position adjacent to the process chamber and used to successively accommodate the work piece generated in the process chamber. It is, however, also conceivable to use the heating station for heating the replaceable building chamber while a work piece is accommodated therein in order to slowly cool the replaceable building chamber and the work piece and to thus reduce the formation of thermal stresses within the work piece upon being cooled down to room temperature.

An apparatus for producing three-dimensional work pieces by irradiating layers of a raw material powder with electromagnetic or particle radiation which comprises a pre/post-treatment section with a heating station may also be claimed independently from an above described contact arrangement. Beside the pre/post-treatment section with a heating station, the apparatus may comprise an irradiation device which may have the above described features, a process chamber, a replaceable building chamber adapted to be arranged adjacent to the process chamber and a carrier for receiving a raw material powder as well as a work piece that is generated from the raw material powder on the carrier by an additive layering process in the process chamber. The carrier may be displaceable relative to the process chamber into the replaceable building chamber in order to transfer a work piece generated in the process chamber by an additive layering process into the replaceable building chamber. Is desired, the apparatus may also comprise an above described contact arrangement, i.e. the apparatus may also comprise an above described first contact element and an above described second contact element.

Basically, the apparatus for producing three-dimensional work pieces according to the invention may comprise only one building chamber support element. As indicated above, said building chamber support element may be adapted to support the replaceable building chamber in its operating position. It is, however, also conceivable to equip the apparatus with a building chamber support element which is adapted to support the replaceable building chamber while being arranged in the heating station. By the interaction of the first and the second contact element the replaceable building chamber then may be brought into electrical contact with the heating station, in particular the heating element of the heating station in order to allow the replaceable building chamber to be heated. Of course, the apparatus may also be equipped with a plurality of building chamber support elements, for example a first building chamber support element adapted to support the replaceable building chamber in its operating position and a second building chamber support element adapted to support the replaceable building chamber while being arranged in the heating station.

In a method for operating an apparatus for producing three-dimensional work pieces by irradiating layers of a raw material powder with electromagnetic or particle radiation, a replaceable building chamber adapted to receive a work piece generated in the apparatus by an additive layering process is provided. A first contact element comprising at least one first electrical conductor element is fastened to the replaceable building chamber. The first electrical conductor element is provided with a first planar conductor surface. Furthermore, a building chamber support element which is adapted to support the replaceable building chamber is provided. A second contact element comprising at least one second electrical conductor element is fastened to the building chamber support element. The second electrical conductor element is provided with a second planar conductor surface. The replaceable building chamber is arranged on the building chamber support element to thereby allow the first planar conductor surface provided on the first electrical conductor element of the first contact element to interact with the second planar conductor surface provided on the second electrical conductor element of the second contact element so as to establish an electrical contact between the replaceable building chamber and the building chamber support element.

All features discussed above with reference to the contact arrangement, in particular features of the replaceable building chamber, the building chamber support element, the first contact element and the second contact element may also be transferred to the method of operating an apparatus for producing three-dimensional work pieces.

In a preferred embodiment of the method, the building chamber support element supports the replaceable building chamber while being arranged adjacent to a process chamber of the apparatus.

The replaceable building chamber may be heated while being accommodated in a heating station of a pre/post-treatment station of the apparatus, the pre/post-treatment station being adapted to accommodate the replaceable building chamber before or after being arranged adjacent to the process chamber of the apparatus.

The building chamber support element may support the replaceable building chamber while being arranged in the heating station.

Figure 2:
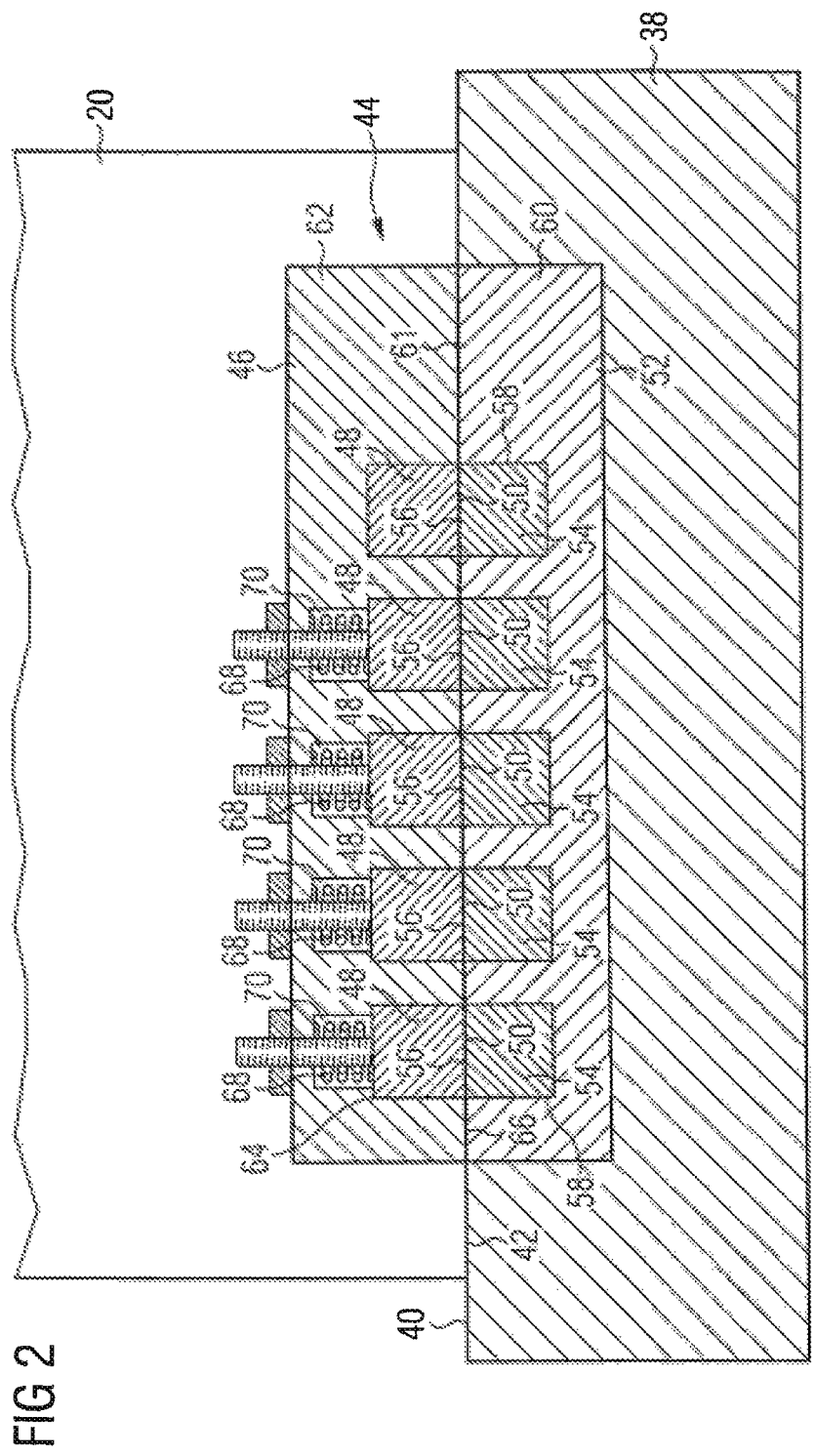

Preferred embodiments of the invention in the following are explained in greater detail with reference to the accompanying schematic drawings, in which:

FIG. 1 shows an apparatus for producing three-dimensional work pieces by irradiating layers of a raw material powder with electromagnetic or particle radiation, FIG. 2 shows a contact arrangement employed in the apparatus according to FIG. 1, and FIG. 3 shows detailed three dimensional view of a first contact element of the contact arrangement according to FIG. 2.

FIG. 1 shows an apparatus 10 which comprises a work piece generating section 12 for generating three-dimensional work pieces by irradiating layers of a raw material powder with electromagnetic or particle radiation. The work piece generating section 12 comprises an irradiation device 14 and a process chamber 16. The process chamber 16 and a region of the work piece generating section 12 which surrounds the process chamber 16 is sealable against the ambient atmosphere and provided with respective connections via which the process chamber 16 and the region of the work piece generating section 12 which surrounds the process chamber 16 may be connected to a vacuum source and/or a pressure source. A carrier 18 is disposed in the process chamber 16 which serves to accommodate raw material powder as well as a work piece generated from the raw material powder by an additive layering process. The carrier 18 is displaceable relative to the process chamber 16 in a vertical direction downwards into a replaceable building chamber 20.

The irradiation device 14 comprises a radiation source, in particular a laser source such as a diode pumped Ytterbium fibre laser emitting laser light at a wavelength of approximately 1070 to 1080 nm, and an optical unit for guiding and processing a radiation beam emitted by the radiation source. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

During operation of the apparatus 10, a powder application device (not shown in the drawings) applies a layer of raw material powder onto the carrier 18 such that a surface of the carrier 18 is covered by the raw material powder. The layer of raw material powder applied to the carrier 18 then is selectively irradiated with the radiation beam emitted by the irradiation device 14. The radiation beam is directed over the raw material powder layer applied onto the carrier 18 in accordance with CAD data of the work piece to be produced. After the first layer of the work piece is completed, the carrier 18 is lowered in a vertical direction in order to compensate for the height gain of the work piece produced on the carrier 18 and to thus allow the application of a successive powder layer by means of the carrier 18. Thereafter, the successive powder layer is irradiated by means of the irradiation device 14. Thus, layer by layer, the work piece is built up on the carrier 18 while the carrier 18 is successively lowered into the replaceable building chamber 20.

After completion of the building process, i.e. when the work piece is entirely accommodated within the replaceable building chamber 20, the replaceable building chamber 20 is sealed by placing a cover 22 on top of the replaceable building chamber 20 and is removed from its operating position in the work piece generating section 12 adjacent to the process chamber 16. Via an exchange section 24, the replaceable building chamber 20 is transferred to a pre/post-treatment section 26. As soon as the replaceable building chamber 20 has left its exchange position in the exchange section 24, a new empty replaceable building chamber 20 may be arranged in the operating position in the work piece generating section 12 adjacent to the process chamber 16 and a new building process for generating a further work piece may be started.

The pre/post-treatment section 26 comprises a heating station 28 which is provided with a heating element 30 heating the replaceable building chamber 20 while being accommodated in the heating station 28. The heating station 28 may be used to preheat an empty replaceable building chamber 20 prior to being arranged in its operating position in the work piece generating section 12 adjacent to the process chamber 16. It is, however, also conceivable to arrange a replaceable building chamber 20 which accommodates a newly generated work piece in the heating station 28 of the pre/post-treatment section 26. The heat transfer from the heating element 30 of the heating station 28 to the replaceable building chamber 20 and the work piece accommodated therein then, for example, may be controlled in such a manner that the replaceable building chamber 20 and the work piece are slowly cooled down to room temperature, thus reducing thermal stresses within the work piece. Beside the heating station 28, the pre/post-treatment section 26 further comprises an excess powder discharge station 32 for discharging excess raw material powder from the replaceable building chamber 20, a work piece removing station 34 for removing the generated work piece from the replaceable building chamber 20 and a parking station 36 for storing the replaceable building chamber 20 until being transferred back into its operating position in the work piece generating section 12.

When being arranged in its operating position in the work piece generating section 12, the replaceable building chamber 20 is supported by the building chamber support element 38. In the embodiment of an apparatus 10 shown in the drawings, the building chamber support element 38 is substantially plate-shaped and has a substantially planar support surface 40 which supports a planar bottom surface 42 of the replaceable building chamber 20. A contact arrangement 44, which is depicted in greater detail in FIG. 2, serves to establish an electrical contact between the replaceable building chamber 20 and the building chamber support element 38.

The contact arrangement 44 comprises a first contact element 46 which is fastened to the replaceable building chamber 20 and which comprises plural first electrical conductor elements 48. Each first electrical conductor element 48 is provided with a first planar conductor surface 50 which is defined by a rectangular side face of the cuboic first electrical conductor element 48. A second contact element 52 of the contact arrangement 44 is fastened to the building chamber support element 38. Like the first contact element 46, also the second contact elements 52 comprises plural second electrical conductor elements 54, wherein each second electrical conductor element 54 is provided with a second planar conductor surface 56 which is defined by a rectangular side face of the cuboic second electrical conductor element 54.

When the replaceable building chamber 20 is supported on the building chamber support element 58, each first planar conductor surface 50 provided on the first electrical conductor element 48 of the first contact element 46 interacts with an associated second planar conductor surface 56 provided on a second electrical conductor element 54 of the second contact element 52. As a result, an electrical contact is established between the replaceable building chamber 20 and the building chamber support element 38. As a result, the replaceable building chamber 20 is connected to an electrical system of the apparatus 10.

The first contact element 46 is fastened to the replaceable building chamber 20 in such a manner that the first planar conductor surfaces 50 provided on the first electrical conductor elements 48 of the first contact element 46 are arranged in the region of the replaceable building chamber 20. The second contact element 52 is fastened to the building chamber support element 38 in such a manner that the second planar conductor surfaces 56 provided on the second electrical conductor elements 54 of the second contact element 52 are arranged in the region of the support surface 40 of the building chamber support element 38. As a result, the replaceable building chamber 20 is electrically connected to the building chamber support element 38 as soon as the replaceable building chamber 20 is positioned on the building chamber support element 38 and the bottom surface 42 of the replaceable building chamber 20 abuts against the support surface 40 of the building chamber support element 38.

As becomes apparent from FIG. 2, the second contact element 52 is provided with fixed second electrical conductor elements 54, i.e. the second electrical conductor elements 54 of the second contact element 52 are fixedly received in respective recesses 58 formed in a base element 60 of the second contact element 52 in such a manner that the second planar conductor surfaces 56 provided on the second electrical conductor elements 54 are arranged flush with a surface 61 of the base element 60. To the contrary, the first contact element 46 is provided with first electrical conductor elements 48 which are movable relative to a base element 62 of the first contact element 46 in respective recesses 64 provided in the base element 62 between a first position and the second position, see FIG. 3. When the first electrical conductor elements 48 are arranged in their first position as depicted in FIG. 3, the first planar conductor surfaces 50 provided on the first electrical conductor elements 48 protrude from a surface 66 of the base element 62.

To the contrary, when the first electrical conductor elements 48 are arranged in their second position (see FIG. 2) the first planar conductor surfaces 50 provided on the first electrical conductor elements 48 are arranged flush with the surface 66 of the base element 62. Each first electrical conductor element 48 is biased into its first position by means of a biasing device 68. In the embodiment of a first contact element 46 depicted in the drawings, each biasing device 68 is designed in the form of a spring which is received in a suitable receptacle 70 formed in the base element 60 of the first contact element 46. A first end of the spring bears against an end face of the receptacle 70, whereas a second end of the spring bears against a surface of a first electrical conductor element 48 which is opposed to the first planar conductor surface 50 of said first electrical conductor element 48. The biasing force of approximately 14 N, which is applied to each first electrical conductor element 48 by an associated biasing device 68, each first electrical conductor element 48 is pressed against its associated second electrical conductor element 54. As a result, the establishment of a reliable electrical connection between the replaceable building chamber 20 and the building chamber support element 38 is guaranteed.

As becomes apparent from FIG. 1, the apparatus 10 comprises a further building chamber support element 38, which is adapted to support the replaceable building chamber 20 while being arranged in the heating station 28 of the pre/post-treatment section 26. The further building chamber support element 38 of the heating station 28 is identical to the building chamber support element 38 of the work piece generating section 12 and also serves to connect the replaceable building chamber 20 to the electrical system of the apparatus 10. In addition, by the interaction of the first contact element 46 fastened to the replaceable building chamber 20 with the second contact element 52 fastened to the building chamber support element 38 of the heating station 28 the replaceable building chamber 20 can be connected to the heating element 30 of the heating station 28 in order to allow the transfer of heat generated by the heating element 30 to the replaceable building chamber 20.

The invention claimed is:

1. A contact arrangement for use in an apparatus for producing three-dimensional work pieces by irradiating layers of a raw material powder with electromagnetic or particle radiation, the contact arrangement comprising:
 a replaceable building chamber adapted to receive a work piece generated in the apparatus by an additive layering process,
 a building chamber support element adapted to support the replaceable building chamber,
 a first contact element fastened to the replaceable building chamber and comprising at least one first electrical conductor element, the first electrical conductor element being provided with a first planar conductor surface, and
 a second contact element fastened to the building chamber support element and comprising at least one second electrical conductor element, the second electrical conductor element being provided with a second planar conductor surface,
 wherein the first planar conductor surface provided on the first electrical conductor element of the first contact element and the second planar conductor surface provided on the second electrical conductor element of the second contact element are adapted to interact with each other so as to establish an electrical contact between the replaceable building chamber and the building chamber support element when the replaceable building chamber is supported on the building chamber support element.

2. The contact arrangement according to claim 1,
wherein the first contact element is fastened to the replaceable building chamber in such a manner that the first planar conductor surface provided on the first electrical conductor element is arranged in the region of a bottom surface of the replaceable building chamber and the second contact element is fastened to the building chamber support element in such a manner that the second planar conductor surface provided on the second electrical conductor element is arranged in the region of a support surface of the building chamber support element.

3. The contact arrangement according to claim 1,
wherein at least one of the first and the second contact element comprises a base element which is provided with at least one recess for accommodating the first and the second electrical conductor element, respectively.

4. The contact arrangement according to claim 3,
wherein the first electrical conductor element is movable relative to the base element of the first contact element between a first position, wherein the first planar conductor surface provided on the first electrical conductor element protrudes from a surface of the base element, and a second position, wherein the first planar conductor surface provided on the first electrical conductor element is arranged flush with the surface of the base element.

5. The contact arrangement according to claim 4,
wherein at least one of the first and the second electrical conductor element is biased into its first position by means of a biasing device.

6. The contact arrangement according to claim 3,
wherein the second electrical conductor element is movable relative to the base element of the second contact element between a first position, wherein the second planar conductor surface provided on the second electrical conductor element protrudes from a surface of the base element, and a second position, wherein the second planar conductor surface provided on the second electrical conductor element is arranged flush with the surface of the base element.

7. An apparatus for producing three-dimensional work pieces by irradiating layers of a raw material powder with electromagnetic or particle radiation, the apparatus comprising:
 an irradiation device,
 a process chamber,
 a replaceable building chamber adapted to be arranged adjacent to the process chamber,
 a carrier for receiving a raw material powder as well as a work piece that is generated from the raw material powder on the carrier by an additive layering process in the process chamber, wherein the carrier is displaceable relative to the process chamber into the replaceable building chamber in order to transfer a work piece generated in the process chamber by an additive layering process into the replaceable building chamber,
 a building chamber support element adapted to support the replaceable building chamber,
 a first contact element fastened to the replaceable building chamber and comprising at least one first electrical conductor element, the first electrical conductor element being provided with a first planar conductor surface, and
 a second contact element fastened to the building chamber support element and comprising at least one second electrical conductor element, the second electrical conductor element being provided with a second planar conductor surface,
 wherein the first planar conductor surface provided on the first electrical conductor element of the first contact element and the second planar conductor surface provided on the second electrical conductor element of the second contact element are adapted to interact with each other so as to establish an electrical contact between the replaceable building chamber and the building chamber support element when the replaceable building chamber is supported on the building chamber support element.

8. The apparatus according to claim 7,
wherein the building chamber support element is adapted to support the replaceable building chamber while being arranged adjacent to the process chamber.

9. The apparatus according to claim 7,
further comprising a pre/post-treatment section adapted to accommodate the replaceable building chamber before or after being arranged adjacent to the process chamber, the pre/post-treatment section comprising a heating station being provided with a heating element for heating the replaceable building chamber while being accommodated in the heating station.

10. The apparatus according to claim 9, wherein the building chamber support element is adapted to support the replaceable building chamber while being arranged in the heating station.

11. A method for operating an apparatus for producing three-dimensional work pieces by irradiating layers of a raw material powder with electromagnetic or particle radiation, the method comprising the following steps:
providing a replaceable building chamber adapted to receive a work piece generated in the apparatus by an additive layering process, wherein a first contact element comprising at least one first electrical conductor element is fastened to the replaceable building chamber, the first electrical conductor element being provided with a first planar conductor surface,
providing a building chamber support element adapted to support the replaceable building chamber wherein a second contact element comprising at least one second electrical conductor element is fastened to the building chamber support element, the second electrical conductor element being provided with a second planar conductor surface,
arranging the replaceable building chamber on the building chamber support element to thereby allowing the first planar conductor surface provided on the first electrical conductor element of the first contact element to interact with the second planar conductor surface provided on the second electrical conductor element of the second contact element so as to establish an electrical contact between the replaceable building chamber and the building chamber support element.

12. The method according to claim 11, wherein the building chamber support element supports the replaceable building chamber while being arranged adjacent to a process chamber of the apparatus.

13. The method according to claim 11, wherein the replaceable building chamber is heated while being accommodated in a heating station of a pre/post-treatment section of the apparatus, the pre/post-treatment section being adapted to accommodate the replaceable building chamber before or after being arranged adjacent to the process chamber of the apparatus.

14. The method according to claim 13, wherein the building chamber support element supports the replaceable building chamber while being arranged in the heating station.

* * * * *